(12) United States Patent
Raz et al.

(10) Patent No.: US 7,561,054 B2
(45) Date of Patent: Jul. 14, 2009

(54) SYSTEM AND METHOD FOR DISPLAYING A DRIVING PROFILE

(75) Inventors: Ofer Raz, Moshav Bnaya (IL); Hod Fleishman, Jerusalem (IL); Itamar Mulchadsky, Tel-Aviv (IL)

(73) Assignee: GreenRoad Driving Technologies Ltd., Beir-Dagan (IL)

( * ) Notice: Subject to any disclaimer, the term of this patent is extended or adjusted under 35 U.S.C. 154(b) by 336 days.

(21) Appl. No.: 11/450,697

(22) Filed: Jun. 9, 2006

(65) Prior Publication Data

US 2007/0001831 A1 Jan. 4, 2007

Related U.S. Application Data

(60) Provisional application No. 60/688,696, filed on Jun. 9, 2005.

(51) Int. Cl.
*G08B 23/00* (2006.01)
(52) U.S. Cl. ...................... 340/576; 340/438
(58) Field of Classification Search .............. 340/576, 340/438, 439, 463, 465, 901, 936, 870.05; 701/1, 29, 41; 180/167, 168, 169
See application file for complete search history.

(56) References Cited

U.S. PATENT DOCUMENTS

| | | | |
|---|---|---|---|
| 4,500,868 A | 2/1985 | Tokitsu et al. | |
| 4,671,111 A | 6/1987 | Lemelson | |
| 5,270,708 A | 12/1993 | Kamishima | |
| 5,483,446 A * | 1/1996 | Momose et al. | 701/1 |
| 5,546,305 A | 8/1996 | Kondo | |
| 5,570,087 A | 10/1996 | Lemelson | |
| 5,805,079 A * | 9/1998 | Lemelson | 340/870.05 |
| 5,821,860 A * | 10/1998 | Yokoyama et al. | 340/576 |
| 5,892,434 A * | 4/1999 | Carlson et al. | 340/438 |
| 6,060,989 A | 5/2000 | Gehlot | |
| 6,278,362 B1 * | 8/2001 | Yoshikawa et al. | 340/439 |
| 6,438,472 B1 | 8/2002 | Tano et al. | |
| 2005/0137757 A1* | 6/2005 | Phelan et al. | 701/1 |
| 2006/0273657 A1* | 12/2006 | Wanke et al. | 303/146 |

* cited by examiner

*Primary Examiner*—Van T. Trieu
(74) *Attorney, Agent, or Firm*—Volpe and Koenig PC

(57) ABSTRACT

The invention provides a system for analyzing and evaluating the performance and behavior of a driver of a vehicle, and for displaying the results of the analysis and evaluation. A vehicle sensor utility is used to monitor the state of the vehicle while being driven by the driver. A raw data stream from the vehicle sensor utility is input to a driving event handler that detects driving events in the raw data stream and outputs to a maneuver detector a driving event string. The maneuver detector is configured to recognize patterns of driving maneuvers. One or more ratings of the driver's driving performance are calculated based upon the driving maneuvers as executed by the driver. The ratings are displayed on a display.

9 Claims, 16 Drawing Sheets

(a)

(b)

SYSTEM AND METHOD FOR DISPLAYING A DRIVING PROFILE

This application claims the benefit of prior U.S. provisional patent application No. 60/688,696 filed Jun. 9, 2005, the contents of which are hereby incorporated by reference in their entirety.

FIELD OF THE INVENTION

The present invention relates to a method and system for displaying information relating to a driver's driving.

BACKGROUND OF THE INVENTION

Driver skill and responsible behavior is critical for vehicle safety. Various methods and systems have therefore been proposed for automatically monitoring a driver and the manner in which the vehicle is being driven. Such systems and methods allow objective driver evaluation to determine the quality of the driver's driving practices and facilitate the collection of qualitative and quantitative information related to the contributing causes of vehicle incidents, such as accidents. These systems and methods help to prevent or reduce vehicle accidents, and vehicle abuse, and also help to reduce vehicle operating, maintenance, and replacement costs. The social value of such devices and systems is universal, in reducing the impact of vehicle accidents. The economic value is especially significant for commercial and institutional vehicle fleets.

Driver monitoring systems vary in their features and functionality and exhibit considerable variability in their approach to the overall problem. Some focus on location and logistics, others on engine diagnostics and fuel consumption, whereas others concentrate on safety management.

For example, U.S. Pat. No. 4,500,868 to Tokitsu et al. is intended as an adjunct in driving instruction. By monitoring a variety of sensors (such as engine speed, vehicle velocity, selected transmission gear, and so forth), the system of Tokitsu determines whether certain predetermined condition thresholds are exceeded, and, if so, to signal an alarm to alert the driver. Alarms are also recorded for later review and analysis. The Tokitsu system is valuable, for example, if the driver were to rapidly depress the accelerator pedal resulting in an acceleration exceeding a predetermined threshold. This would result in an alarm, cautioning the driver to reduce the acceleration. If the driver were prone to such behavior, this is indicated in the records created by the system.

U.S. Pat. Nos. 4,671,111 and 5,570,087 to Lemelson teach the use of accelerometers and data recording/transmitting equipment to obtain and analyze vehicle acceleration and deceleration.

U.S. Pat. No. 5,270,708 to Kamishima discloses a system that detects a vehicle's position and orientation, turning, and speed, and coupled with a database of past accidents at the present location and determines whether the present vehicle's driving conditions are similar to those of a past accident, and if so, alerts the driver. If, for example, the current vehicle speed on a particular road exceeds the speed threshold previously stored in the database at that point of the road, the driver could be alerted. Moreover, if excessive speed on that particular area is known to be the cause of many accidents, the system could notify the driver of this.

U.S. Pat. No. 5,546,305 to Kondo performs an analysis of vehicle speed and acceleration, engine rotation rate, and applies threshold tests. Such an analysis can often distinguish between good driving behavior and erratic or dangerous driving behavior (via a driving "roughness" analysis). Providing a count of the number of times a driver exceeded a predetermined speed threshold, for example, may be indicative of unsafe driving.

U.S. Pat. No. 6,060,989 to Gehlot describes a system of sensors within a vehicle for determining physical impairment of the driver that might interfere with the driver's ability to safely control his vehicle. Specific physical impairments illustrated include intoxication, fatigue and drowsiness, or medicinal side-effects. In Gehlot's system, sensors monitor the driver directly, rather than the vehicle.

U.S. Pat. No. 6,438,472 to Tano, et al. describes a system which statistically analyzes driving data (such as speed and acceleration data) to obtain statistical aggregates that are used to evaluate driver performance. Unsatisfactory driver behavior is determined when certain predefined threshold values are exceeded. A driver whose behavior exceeds a statistical threshold from what is considered safe driving, is classified as a "dangerous" driver. Thresholds can be applied to the statistical measures, such as standard deviation.

In addition to the above issued patents, there are several commercially available products for monitoring vehicle driving behavior. The "Mastertrak" system by Vetronix Corporation of Santa Barbara, Calif., is intended as a fleet management system which provides an optional "safety module" that addresses vehicle speed and safety belt use. A system manufactured by SmartDriver of Houston, Tex., monitors vehicle speed, accelerator throttle position, engine and engine RPM, and can detect, count, and report on the exceeding of thresholds for these variables.

SUMMARY OF THE INVENTION

The present invention provides a method and system for obtaining a driver's driving profile and displaying the profile.

The method and system of the present invention is based on the realization that a driver's driving ability is revealed in the manner that he executes common driving maneuvers. Such driving maneuvers include passing, lane changing, traffic blending, making turns, handling intersections, handling off- and on-ramps, driving in heavy stop-and-go traffic, accelerating, accelerating before turn, accelerating during lane change, accelerating into a turn, accelerating into a turn from rest, accelerating from rest, accelerating out of a turn, accelerating while passing, braking, braking after a turn, braking before a turn, stopping, braking out of a turn, braking within a turn, failed lane change, failed passing, lane change, lane change braking, turning, turning and accelerating, and executing a U-turn.

The system according to the invention comprises one or more vehicle-installed sensing devices for monitoring the state of the vehicle and outputting data indicative thereof. The sensing devices may be linked to a processor located on the vehicle for initial processing of the data.

The method of the invention identifies fundamental driving events in the driver's driving in one or more driving sessions (also referred to herein as "trips") from a raw data stream generated by the vehicle sensors. Driving maneuvers are then identified as predetermined sequences of driving events.

Values of parameters of the driver's driving from are then calculated from the identified driving maneuvers as executed by the driver. The calculated parameter values are then displayed on a visual display, such as a CRT screen or other visual display device. Alternatively or additionally, the calculated values may be used to classify the driver's driving into two or more driving categories such as "safe driving", "unsafe driving" or "dangerous driving". The classification may be determined for each driving session, or a cumulative classification of the driver's driving may be determined for a plurality of driving sessions.

The system in most cases comprises a system server utility and a vehicle-carried processor unit. The communication between the vehicle and a server utility will typically be wireless, e.g. transmitted over a cellular network or any other suitable wireless link. A wireless link between the vehicle-installed utilities and the server, permit an essentially real time download of data on the driving activity, and at times partially processed data from the vehicle utilities to the server. However, the communication may at times be through a physical link or a short range contact-less communication, for example, when the vehicle arrives at a central location such as a service center or a refueling station, etc.

A driving event handler and the maneuver detector may each, independently, be a software utility operating in a processor, a hardware utility configured for that purpose or, typically, a combination of the two. The event handler and the maneuver detector may both be included in one computing unit, as hardware and/or software modules in such unit, or each one may constitute a separate hardware and/or software utility operative in different units. Such different units may be installed in a vehicle, although, as may be appreciated, they may also be located at a remote location, e.g. in a system server, or one may be installed in the vehicle while the other is located at a remote location. In the case where one or more of the system's components is installed in a remote location, the receipt of input from the upstream vehicle installed component may be wireless, in which case the input may be continuous or batch wise (e.g. according to a predefined transmission sequence) or may be through physical or proximity communication, e.g. when a vehicle comes for service or refueling.

The system of the invention may include a database of characteristic driving maneuvers to compare at least one driving maneuver as executed by the driver to a characteristic driving maneuver previously stored in the database. The database may record driving maneuver representations representative of an average driver's performance, e.g. an average performance in a fleet of drivers, in a defined neighborhood, in a country, drivers of a specific age group, etc. In such a case the driving maneuver for a driver may be compared to the characteristic driving maneuver.

Displaying the driver's profile, in accordance with the invention, may assume any one of a plurality of different forms. In accordance with one illustrative, non-limiting embodiment, a rating of the driving profile is in the form of color. For example, red may indicate a driver's profile that is classified as "risky driving", yellow may indicate a profile that is classified as "intermediate" and green may indicate a safe driving profile. Of course, as will be appreciated, a color code rating may have a much wider spectrum of different colors, the colors may be different for different performance ratings, etc. In accordance with other embodiments, the driving performance rating may be coded in the form of a shape of an icon on a screen, may be coded in the form of tabulated data, it may be a numerical rating indicator, and others. As will be appreciated, the invention is not limited to the manner in which the rating indicator is coded on the display.

The invention may be applied to a plurality of drivers, for example, a plurality of drivers driving one or more joint vehicles, for example, drivers of a fleet of vehicles, drivers in a family all jointly sharing one or a few vehicles, etc. In one embodiment, driving parameters for each driver may be calculated and the results for each driver displayed on separate pages on the display. A ranking of the driver among the group of drivers may be calculated and displayed on the driver's page. Alternatively or additionally, the driving parameters obtained for each driver may be processed to determine a cumulative data set for the group of drivers that is displayed on the display.

The communication between the vehicle and a server utility will typically be wireless, transmitted over a cellular network or any other suitable wireless link. A wireless link between the vehicle-installed utilities and the server, permit an essentially real time download of data on the driving activity, and at times partially processed data from the vehicle utilities to the server. The wireless link may allow ongoing communication between the server and also to collecting utilities. However, it is possible to use wireless communication for batch wise data transmission, e.g. once an hour, once daily, etc. A wireless link also permits transmission of essentially real time driving performance rating information to the vehicle for displaying and thereby relaying this information back to the driver for an essentially real time feedback on driving performance.

In accordance with another embodiment of the invention, the communication between the server and vehicle-installed system utilities may be achieved by downloading information through a data port that physically links to the vehicle, e.g. when the vehicle comes in for service or fueling. The data port may also be a modem for short-range contact less communication with a corresponding contact less port in the vehicle. As will no doubt be appreciated, the invention is not limited to the matter in which communication between the different utilities of the system is exercised.

Thus, in its first aspect the invention provides a system for analyzing and evaluating the performance and behavior of a driver of a vehicle, the system comprising:

a vehicle sensor utility operative to monitor the state of the vehicle and to output a raw data stream corresponding thereto;

a driving event handler operative to receive the raw data stream, detect driving events based thereon and to output a driving event string containing at least one driving event representation corresponding thereto;

a maneuver detector operative to receive said at least one driving event representation, recognize patterns of driving maneuvers and to construct and output a driving maneuver representation corresponding thereto, said driving maneuver representation containing a representation of at least one driving maneuver; and a processor configured to calculate one or more ratings of the driver's driving performance and to display the ratings on a display; and the display.

In its second aspect, the invention provides a method for analyzing and evaluating the performance and behavior of the driver of a vehicle, comprising:

(a) monitoring the state of a vehicle to obtain a raw data stream corresponding thereto;

(b) from the raw data stream detecting driving events and generating therefrom a driving event string containing at least one driving event representation corresponding thereto;

(c) from said driving event string, constructing and outputting a driving maneuver representation containing a representation of at least one driving maneuver; and (d) calculating one or more ratings of the driver's driving performance;

(e) displaying the ratings on a display.

In its third aspect, the invention provides a program storage device readable by machine, tangibly embodying a program of instructions executable by the machine to perform method steps for analyzing and evaluating the performance and behavior of the driver of a vehicle, comprising:

(a) obtain a raw data stream corresponding thereto;
(b) from the raw data stream detecting driving events and generating therefrom a driving event string containing at least one driving event representation corresponding thereto;
(c) from said driving event string, constructing and outputting a driving maneuver representation containing a representation of at least one driving maneuver;
(d) calculating one or more ratings of the driver's driving performance; and
(e) displaying the ratings on a display.

In its fourth aspect, the invention provides a computer program product comprising a computer useable medium having computer readable program code embodied therein for analyzing and evaluating the performance and behavior of the driver of a vehicle, the computer program product comprising:

computer readable program code for causing the computer to receive a raw data stream indicative of a state of the vehicle;

computer readable program code for causing the computer to detect from the raw data stream driving events and generating therefrom a driving event string containing at least one driving event representation corresponding thereto;

computer readable program code for causing the computer to construct and output from said driving event string, a driving maneuver representation containing a representation of at least one driving maneuver;

computer readable program code for causing the computer to calculate one or more ratings of the driver's driving performance; and computer readable program code for causing the computer to displaying the ratings on a display.

In its fifth aspect, the invention provides a computer program comprising computer program code means for performing all the steps of claim 14 when said program is run on a computer.

In its sixth aspect, the invention provides a computer program of the invention embodied on a computer readable medium.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

BRIEF DESCRIPTION OF THE DRAWINGS

The invention is herein described, by way of example only, with reference to the accompanying drawings, wherein.

DETAILED DESCRIPTION OF EXEMPLARY EMBODIMENTS

The principles and operation of a system and method according to the present invention may be understood with reference to the drawings and the accompanying description that illustrate some specific and currently preferred embodiments. It is to be understood that these embodiments, while illustrative are non-limiting but rather illustrative to the full scope of the invention defined above.

Figure 1:
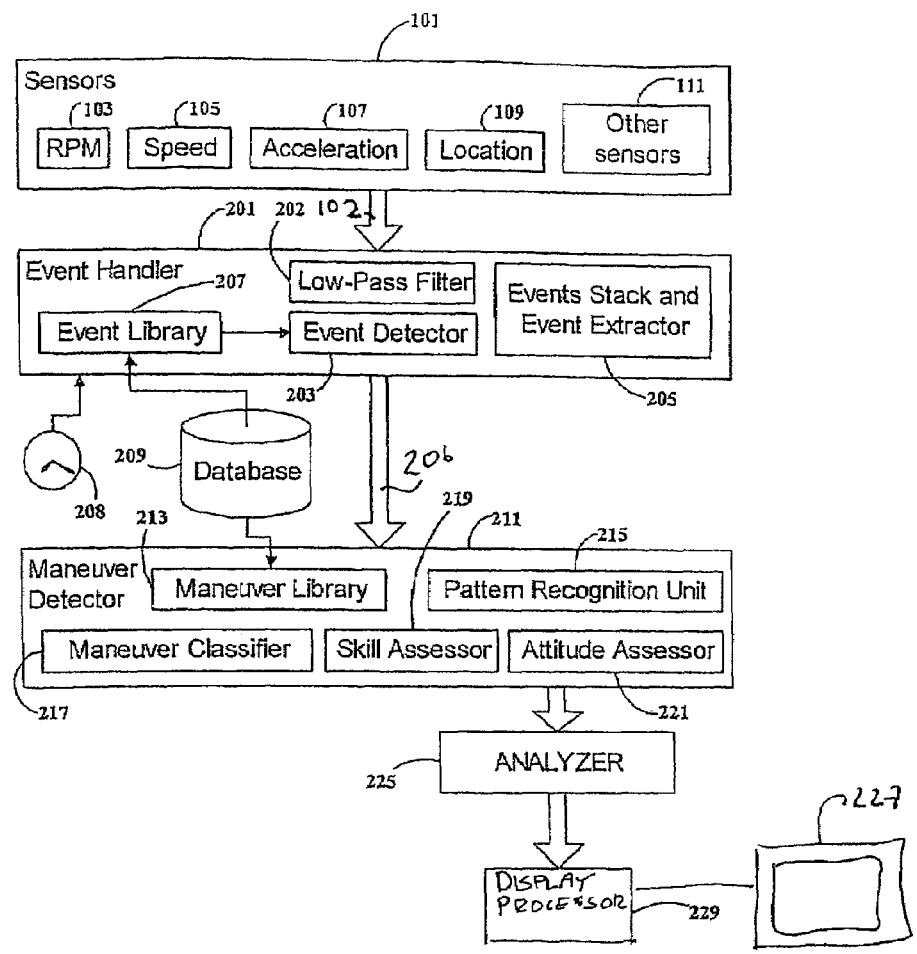
FIG. 1 shows a method and system for obtaining and displaying driving information in accordance with one embodiment of the invention.

FIG. 1 shows a system for obtaining and displaying a driver profile in accordance with one embodiment of the invention. The system of the invention comprises a set of sensors 101 that includes one or more sensors such as a tachometer 103, a speedometer 105, one or more accelerometers 107, a GPS receiver 109, and optional additional sensors 111. As will be appreciated, the invention is not limited to a specific type of a sensor set and any currently available or future available sensing system may be employed in the present invention. In the case of accelerometers, it is understood that an accelerometer is typically operative to monitoring the acceleration along one particular specified vehicle axis, and outputs a raw data stream corresponding to the vehicle's acceleration along that axis. Typically, the two main axes of vehicle acceleration that are of interest are the longitudinal vehicle axis—the axis substantially in the direction of the vehicle's principal motion ("forward" and "reverse"); and the transverse (lateral) vehicle axis—the substantially horizontal axis substantially perpendicular to the vehicle's principal motion ("side-to-side"). An accelerometer which is capable of monitoring multiple independent vector accelerations along more than a single axis (a "multi-axis" accelerometer) is herein considered as being equivalent to a plurality of accelerometers, wherein each accelerometer of the plurality is capable of monitoring acceleration along a single axis. Additional sensors in the set of sensors 101 can include sensors for foot brake position, accelerator position, steering wheel position, handbrake position, activation of turn signals, transmission shift position, clutch position, and the like. Some of the sensors, such as tachometer 103 and speedometer 105 may output a continuously varying signal which represents the magnitude of a measured parameter. Other sensors, such as a transmission shift position sensor may have a discrete output which indicates which gear is in use. A more complex output would come from GPS receiver 109, according to the formatting standards of the manufacturer or industry. Other sensors can include a real-time clock, a directional device such as a compass, one or more inclinometers, temperature sensors, precipitation sensors, ambient light sensors, and so forth, to gauge actual road conditions and other driving factors.

The output of sensor set 101 is a stream 102 of raw data, in analog and/or digital form. The raw data stream 102 is input into a driving event handler 201, which contains a low-pass filter 202, a driving event detector 203, a driving events stack and driving event extractor 205 for storing and managing driving events, and a driving event library 207, which obtains data from a database 209.

Driving events are fundamental driving operations that characterize basic moves of driving, as explained and illustrated in detail below. The driving event handler 201 performs an analysis on the raw data stream 102 from sensor set 101, and identifies in the raw data stream driving events. Driving event detector 203 performs a best-fit comparison of the filtered sensor data stream with event types from event library 207, such as by using a sliding window technique over the data stream. A real-time clock 208 provides a reference time input to the system, illustrated here for a non-limiting embodiment of the present invention as input to driving event handler 201. The driving handler 201 outputs a string of driving events 206. A driving event string may be a time-ordered non-empty set of driving event symbols arranged in order of their respective occurrences.

A driving event may be characterized by a symbol that qualitatively identifies the basic driving operation, and may be associated with one or more numerical parameters which quantify the driving event. These parameters may be derived from scaling and offset factors used in making a best-fit comparison against events from the event library 207. For example, the scaling of the time axis and the scaling of the variable value axis which produce the best fit of the selected segment of the input data stream to the model of the event in event library 207 can be used as numerical parameters (in most cases, one or more of these numerical parameters are related to the beginning and end times of the driving event). If close fits can be obtained between the string of driving events and the input data stream, the event string (including the event symbols and associated parameter set) can replace the original data stream, thereby greatly compressing the data and providing an intelligent analysis thereof.

The driving event string 206 is input into a driving maneuver detector 211. A driving maneuver is recognized as a sequence of driving events which are executed when the maneuver is executed. A "lane change", for example, is a driving maneuver that, in the simplest case, may be represented by a sequence of a lateral acceleration followed by a lateral deceleration during a period of forward motion. A lane change during a turn is more involved, but can be similarly represented by a sequence of driving events. As in the case of the driving events themselves, driving maneuvers can contain one or more numerical parameters, which are related to the numerical parameters of the driving events which make up the driving maneuver.

A driving maneuver sequence is a time-ordered non-empty set of driving maneuvers arranged according to the respective times of their occurrence. Referrring still to FIG. 1, it is seen that in order to derive a sequence of driving maneuvers from a string of driving events, maneuver detector 211 contains a maneuver library 213 fed from database 209, a pattern recognition unit 215 to recognize sequences of driving events which make up driving maneuvers, and a maneuver classifier 217 to construct a driving maneuver sequence output. By comparing the timing and other quantities of the driving maneuver with those of known skillful drivers, a skill assessor 219 develops and assigns a skill rating for the current driver's handling of the driving maneuver. Furthermore, by analyzing the magnitude of certain key parameters (such as those related to acceleration and deceleration during the maneuver), an attitude assessor 221 can develop and assign an attitude rating to the current driver's execution of the driving maneuver. Moreover, each maneuver may be assigned a weighting driving risk coefficient for developing and assigning an aggregate attitude rating for the current driver.

The output 220 of the maneuver detector 211 may be input to an analyzer 225 that executes a driving anomaly detection in which the output driving maneuver sequence 220 is checked for inconsistencies in a previously obtained driving profile of the driver. A profile or set of profiles for a driver can be maintained in the database 209 for comparison with the driver's current driving profile. A set of profiles for various maneuvers can be maintained so that any driving maneuver executed by the driver can be compared with a previously recorded reference maneuver of the same type (namely, for example, a lane change maneuver with a recorded lane change maneuver, etc.). If there is a significant discrepancy between the current driving maneuvers and previously stored reference profiles for the driver, which are used as reference, the driving inconsistencies can be reported to an emergency alert for follow-up checking or investigation. As previously noted, a significant discrepancy or inconsistency may indicate an unsafe condition (e.g. as a result of a driver's current attitude, as a consequence of driving under the influence of alcohol and/or drugs, etc.).

The sequence of driving maneuvers 220 and/or the output of the analyzer 225 is input to display processor 229. The display processor 229 processes the data and brings the data into a form suitable for displaying a display. The output 226 of the display processor is displayed on a display 227.

As a non-limiting example, a simple event is to start the vehicle moving forward from rest (the "start" event). A numerical parameter for this event is the magnitude of the acceleration. A generalized version of this event is a speed increase of a moving vehicle (the "accelerate" event). Another simple event is to slow the vehicle to a halt from a moving condition (the "stop" event).

Table 1 includes non-limiting examples of some common driving maneuvers, their common meaning in a driving context, and their suggested driving risk coefficients. It is noted that there are many possible descriptive terms for the driving events and driving maneuvers described herein, and the choice of the terms that are used herein has by itself no significance in the context of the invention. For example, the "Passing" driving maneuver is herein named after the common term for the maneuver in the United States, but the same maneuver is also referred to as "bypassing" or "overtaking" in some locations.

In a non-limiting example, coefficients range from 1 to 10, with 10 representing the most dangerous driving maneuvers. Risk coefficients, of course, are subjective, and according to other embodiments of the present invention may be redefined to suit empirical evidence. The coefficients may also be different for different countries, different driver populations, etc. The coefficients may also be different for different countries, different driver populations, etc. The coefficients may be different at different times. For example, driving at a speed above a given threshold may be assigned a relatively low risk coefficient during the daylight hours, and a higher risk coefficient during the night.

TABLE 1

Examples of Driving Maneuvers and Driving Risk Coefficients

| Driving Maneuver | Coefficient |
| --- | --- |
| Accelerate | 3 |
| increase vehicle speed | |
| Accelerate before Turn | 6 |
| increase vehicle speed prior to a turn | |
| Accelerate during Lane Change | 5 |
| increase vehicle speed while moving to a different travel lane | |
| Accelerate into Turn | 5 |
| Increase vehicle speed while initiating a turn | |
| Accelerate into Turn out of Stop | 6 |
| start moving vehicle while initiating a turn from a stopped position | |
| Accelerate out of Stop | 5 |
| start moving vehicle from a stopped position | |
| Accelerate out of Turn | 4 |
| increase vehicle speed while completing a turn | |
| Accelerate while Passing | 5 |
| increase vehicle speed while overtaking and bypassing a leading vehicle when initially traveling in the same travel lane | |
| Braking | 5 |
| applying vehicle brakes to reduce speed | |
| Braking after Turn | 6 |
| applying vehicle brakes to reduce speed after completing a turn | |
| Braking before Turn | 7 |
| applying vehicle brakes to reduce speed before beginning a turn | |
| Braking into Stop | 3 |
| applying vehicle brakes to reduce speed and coming to a stopped position | |
| Braking out of Turn | 7 |
| applying vehicle brakes to reduce speed while completing a turn | |
| Braking within Turn | 8 |
| applying vehicle brakes to reduce speed during a turn | |
| Failed Lane Change | 10 |
| aborting an attempted move to a different travel lane | |
| Failed Passing | 10 |
| aborting an attempt to overtake and bypass a leading vehicle when initially traveling in the same travel lane | |
| Lane Change | 4 |
| moving into a different travel lane | |
| Lane Change and Braking | 8 |
| moving into a different travel lane and then applying vehicle brakes to reduce speed | |
| Passing | 4 |
| overtaking and bypassing a leading vehicle when initially traveling in the same travel lane | |
| Passing and Braking | 8 |
| overtaking and passing a leading vehicle when initially traveling in the same travel lane and then applying vehicle brakes to reduce speed | |
| Turn | 3 |
| substantially changing the vehicle travel direction | |
| Turn and Accelerate | 4 |
| substantially changing the vehicle travel direction and then increasing vehicle speed | |
| U-Turn | 5 |
| substantially reversing the vehicle travel direction | |

Figure 2:
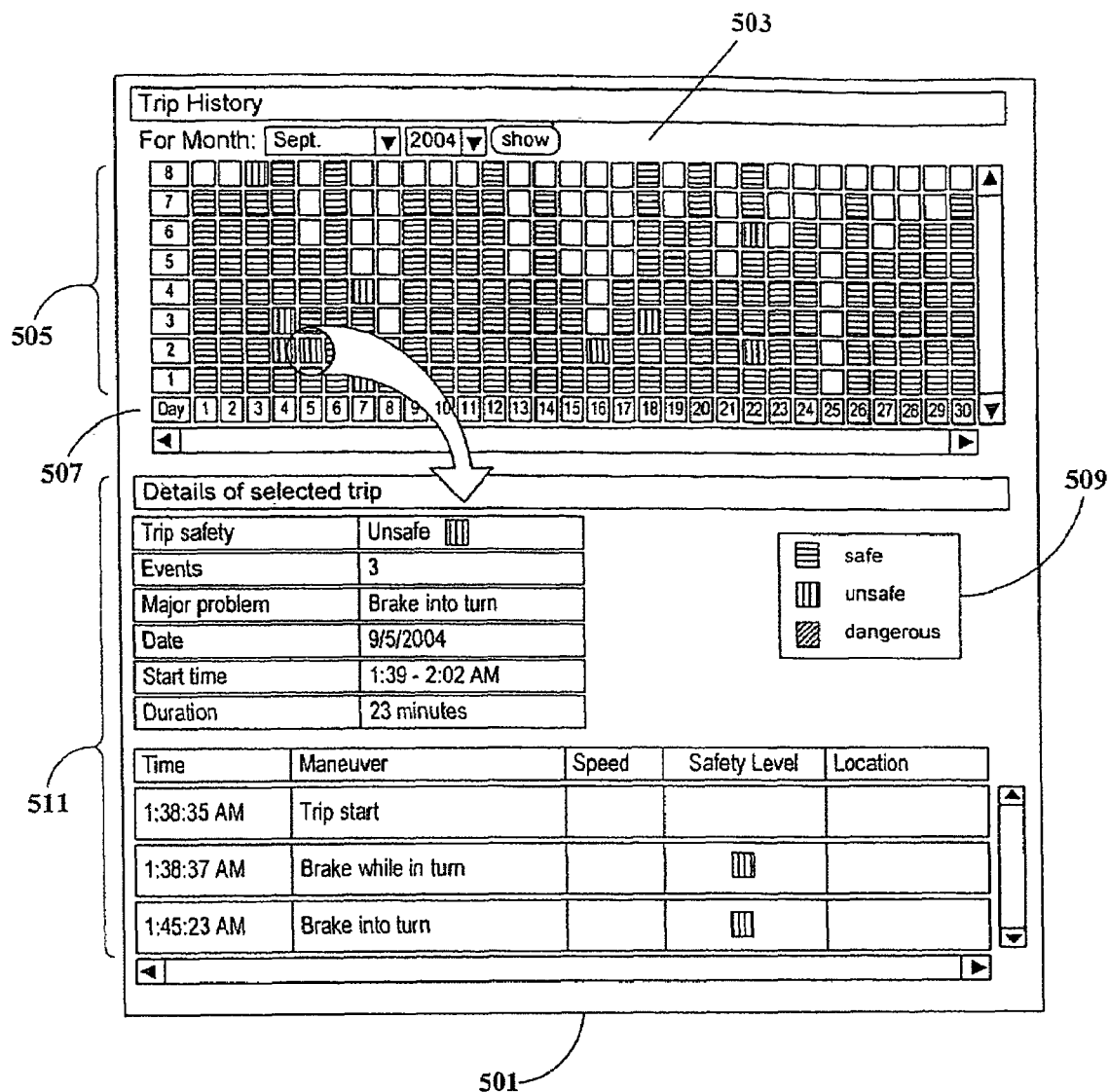
FIG. 2 is a non-limiting example of a display screen of a safe driving pattern according to an embodiment of the present invention.

FIG. 2 shows a non-limiting example of a display screen 501 displaying a driver's driving profile in accordance with one embodiment of the invention. The display screen 501 may be displayed, for example, on a CRT screen. A window pane 503 presents a graphical display in stacked format of the rating of the driver's driving in each of a plurality of individual driving sessions ("trips") 505 arranged according to day 507. Blank boxes represent no trip. In the embodiment shown in FIG. 2, the different ratings are indicated by different forms of hatching. Alternatively or additionally, the ratings may be indicated by different colors. For example, "safe driving" may be indicated by the color green; "unsafe driving" the color yellow; and "dangerous driving" the color red. A legend 509 provides a key to the ratings. Driving session 2 of day 5 has been selected for detailed viewing in a pane 511. This pane shows each maneuver executed by the driver during the driving session, the time at which the maneuver was executed and the safety rating of the maneuver. The driving profile shown in FIG. 2 is a driving profile of a "safe" driver since most of his driving sessions have been classified as "safe".

Figure 3:
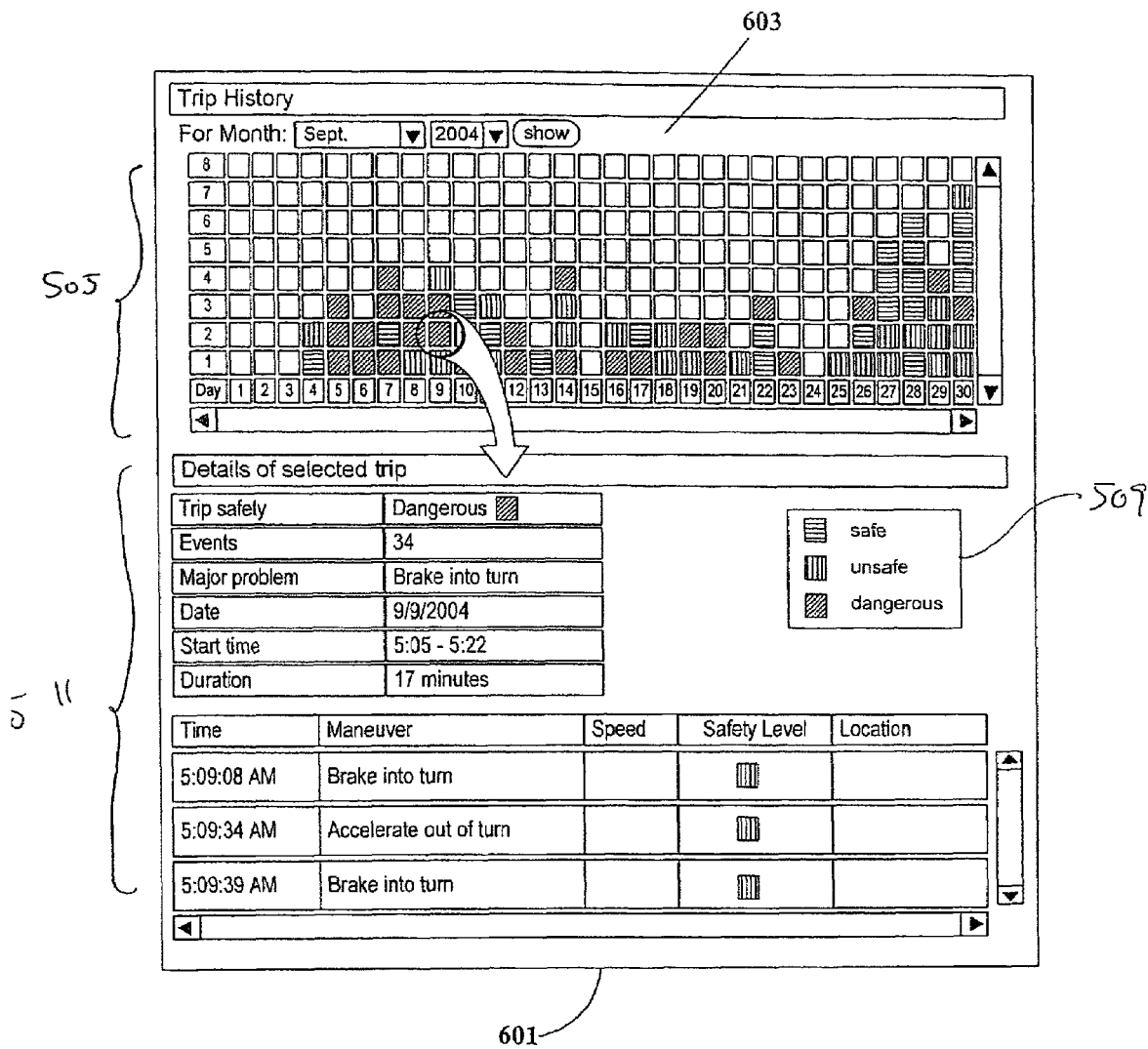
FIG. 3 is a non-limiting example of a display screen of a dangerous driving according to an embodiment of the present invention.

FIG. 3 shows a non-limiting example of a display screen 601 of a driving profile of another driver driving having a "dangerous driving profile". The screen 601 is similar to the screen 501 shown in FIG. 2, and components of the screen 601 previously described above in reference to FIG. 2 are assigned the same reference numeral in FIG. 3 without further comment. Driving session 2 of day 9 has been selected for detailed viewing. The driving profile shown in FIG. 3 is a driving profile of a "dangerous" driver since most of his driving sessions have been classified as "dangerous".

Figure 5:
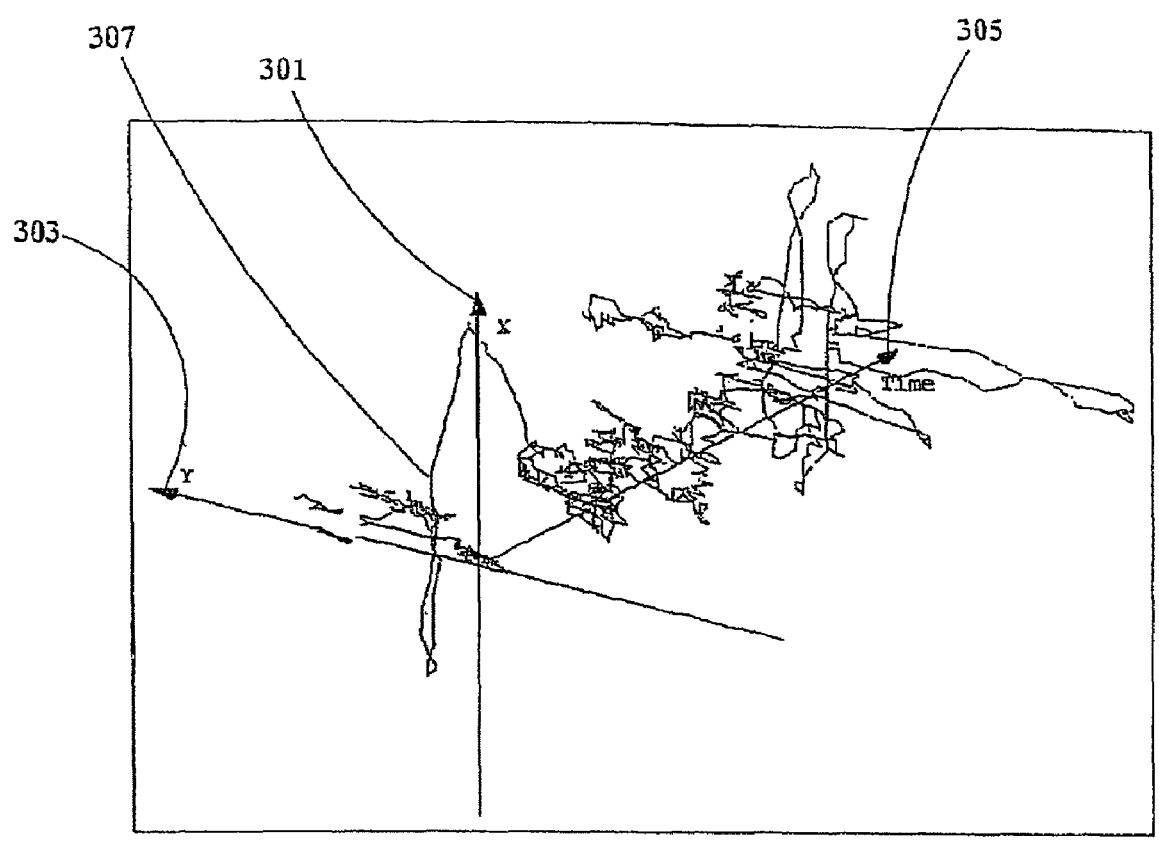
FIG. 5 shows a graph of a raw data stream from multiple vehicle accelerometers.
Figure 6:
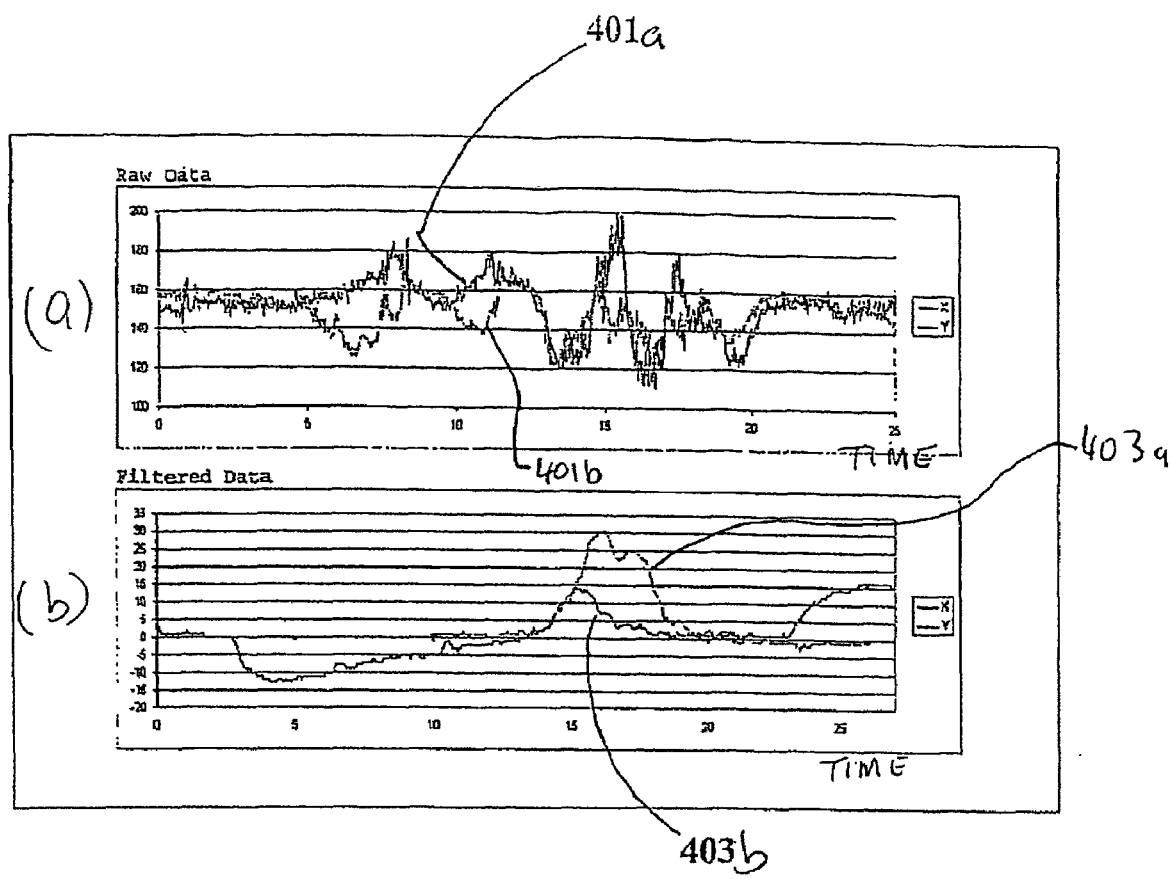
FIG. 6 shows filtering of the raw data stream of FIG. 5.

In addition to the stacked format illustrated in FIG. 5 and FIG. 6, other display formats according to non-limiting embodiments of the present invention include histograms, line graphs, x-y plots, x-y-z surface plots, scatter graphs, bar charts, pie charts, variations thereon and many others.

Figure 18:
FIG. 18 is a non-limiting example of a display screen of a safe driving pattern according to another embodiment of the present invention.

FIG. 18 shows a display screen 180 of a driving profile in accordance with another embodiment of the invention. The screen 180 includes a general assessment pane 181 showing the overall driving profile 182, which may be, for example, the number of abnormal maneuvers the driver has made in one or more driving sessions. The pane 181 also shows the driver trend 183, for example, whether the rate of abnormal maneuvers is increasing or decreasing. The pane 181 further includes a number of points or "stars" that the driver has accumulated for good driving. The stars may be traded for various incentives in order to encourage proper driving by the driver. A second pane 185 in the screen 180 shows general statistics relating to the driver's driving in a recent time period, such as the last seven days, and includes a comparison of the driver's rating with the cumulative rating of the drivers in group of drivers. A third pane 186 shows the driver's rating with respect to specific aspects of the driver's driving, such as "speed handling", "excessive maneuvers", "corner handling", "braking patterns" and "acceleration patterns". The various ratings in the screen 180 may be highlighted, each rating being assigned a specific color, in order to facilitate interpretation of the screen 180. A legend 187 is provided of the various color indications.

Figure 4:
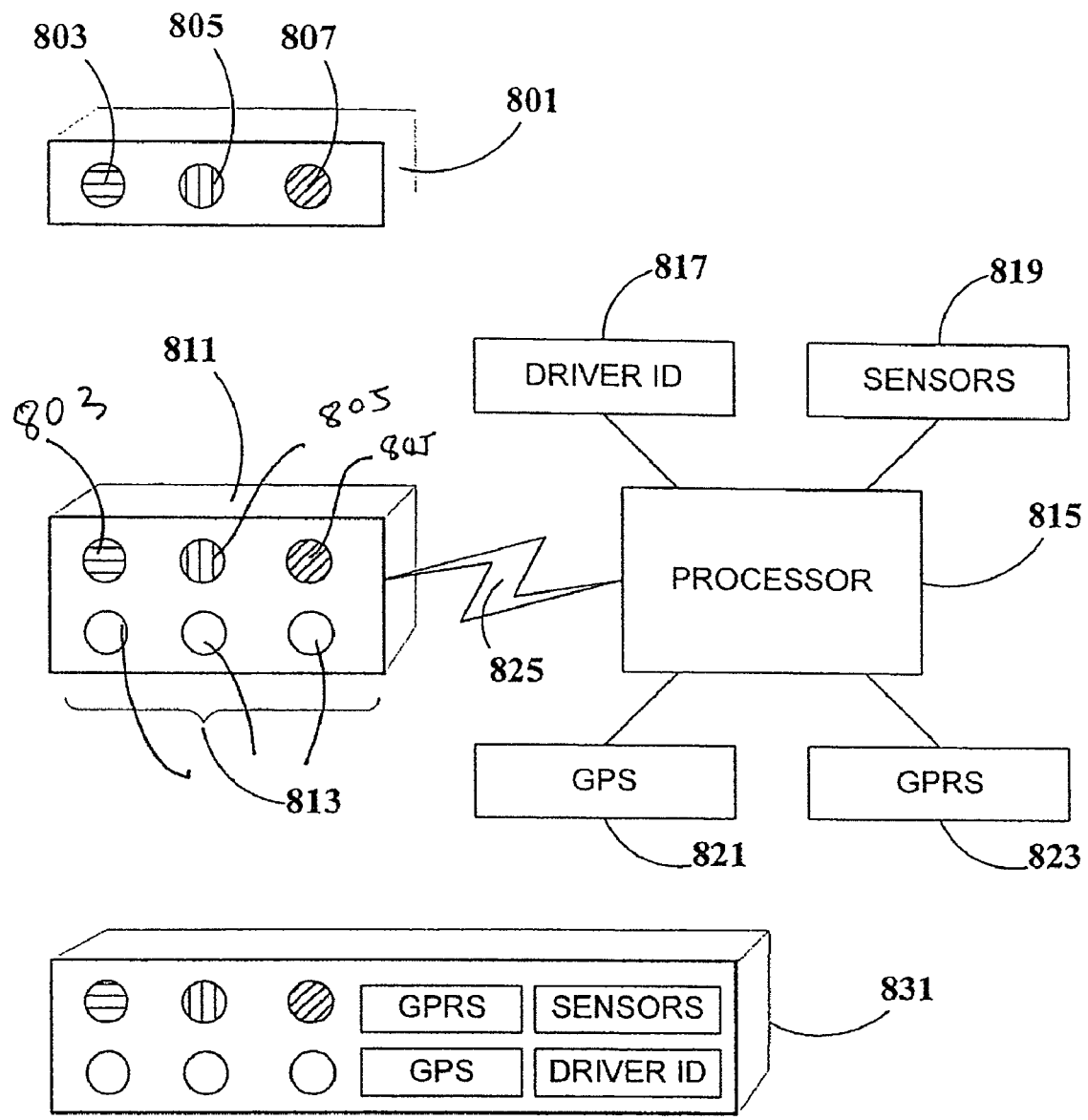
FIG. 4 illustrates driver information vehicle display configurations according to non-limiting embodiments of the present invention.

FIG. 4 shows displays for displaying driver information in accordance with other embodiments of the invention. The displays shown in FIG. 4 are intended for mounting in the vehicle being driven, and display the rating of the driver's driving in real time. In one embodiment, a unit 801 has separate indicator lights for indicating different driving conditions: a light 803 when illuminated may indicate "safe driving, illumination of a light 805 indicates "unsafe driving"; and illumination of a light 807 indicates dangerous driving. In another embodiment, a unit 811 contains, in addition to the lights 803, 805, and 807, indicator lights 813 for displaying further information. A non-limiting example of the use for such further information is the display of security codes to deter theft and unauthorized use of the vehicle. In this embodiment, a remote processor 815 has access to a driver ID 817 and sensors 819. The remote processor 815 may connected to any one or more of a Global Positioning System ("GPS") receiver 821, a General Packet Radio Service ("GPRS") transceiver 823, and the unit 811 by a wireless link 825, non-limiting examples of which are Bluetooth and WiFi. In still another embodiment of the present invention, a unit 831 combines display, processor, and other functions in a single package.

Analysis of Raw Data to Obtain a Driving Event String

FIG. 5 illustrates an example of raw data stream 307 obtained from two vehicle accelerometers, as plotted in a 3-dimensional form. An x-axis 301 represents the longitudinal acceleration of the vehicle (in the direction in which the vehicle is normally traveling), and hence represents forward and reverse acceleration and deceleration data 307. A y-axis 303 represents the transverse (lateral) acceleration of the vehicle to the left and right of the direction in which the vehicle is normally traveling. A time axis 305 is perpendicular to the x and y-axes. Data 307 are representative of the time-dependent raw data stream output from sensor set 101 (FIG. 2).

Note that FIG. 5 is a non-limiting example for the purpose of illustration. Other raw sensor data streams besides acceleration can be represented in a similar manner. Other examples include accelerator (gas) pedal, position, speed, brake pedal position and brake pressure, gear shifting rate, etc. In other cases, however, the graph may not need multiple data axes. Acceleration is a vector quantity and therefore has directional components, requiring multiple data axes. Scalar variables, however, have no directional components and two-dimensional graphs may suffice to represent the data stream in time. Speed, brake pressure, and so forth are scalar variables.

FIG. 6*a* shows the data depicted in FIG. 5 in a two-dimensional form in which the acceleration data in two dimensions (the x and y axes in FIG. 5), are shown on a common time axis. The longitudinal acceleration (the x axis in FIG. 3) is shown as a data stream 401*a*, and the lateral acceleration (the y axis in FIG. 5) is shown as a data stream 140*b*. FIG. 6*b* illustrates the effect of the initial filtering of the data streams x and y in FIG. 6*a* performed by low-pass filter 202. After applying low-pass filter 202 to each of the data streams 401*a* and 401*b*, respective filtered data streams 403*a*, and 403*b* are output in which noise has been removed is output. In addition to low-pass filtering, low-pass filter 202 can also apply a moving average and/or a domain filter.

Figure 7:
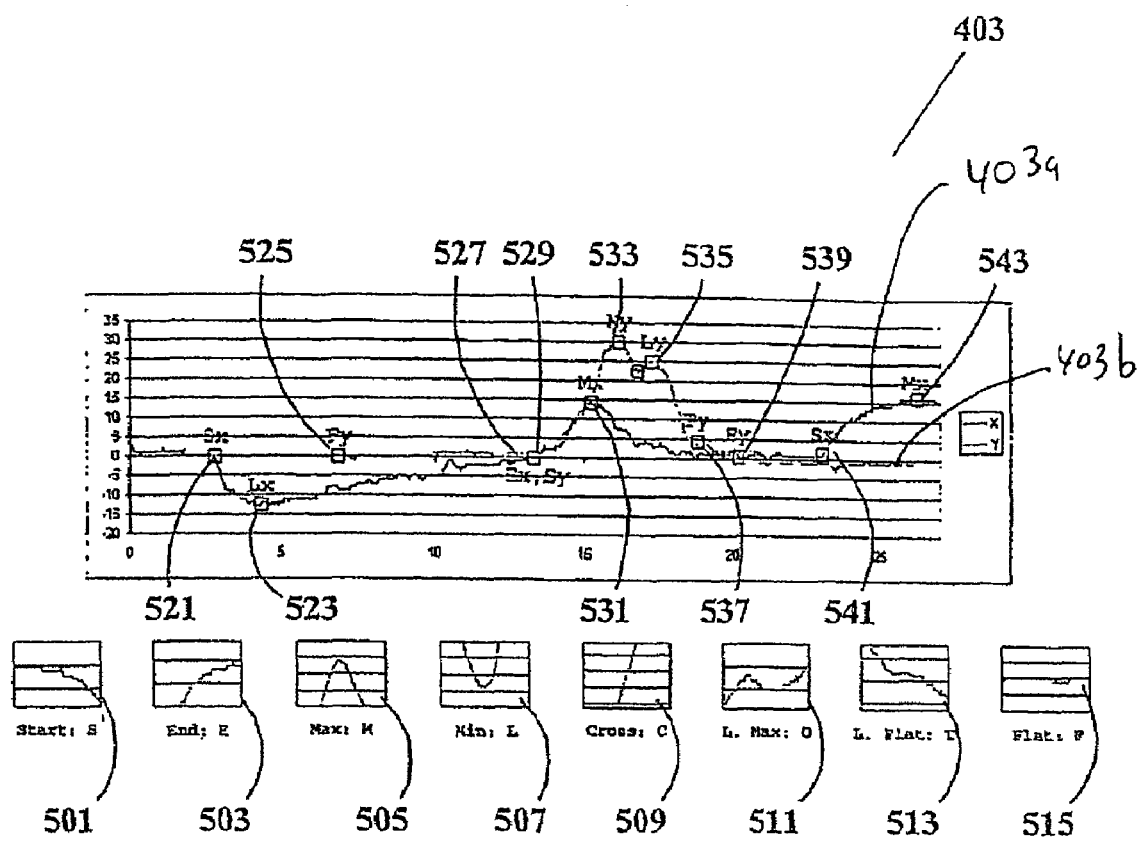
FIG. 7 shows parsing the filtered data stream of FIG. 6 to derive a string of driving events.
Figure 8:
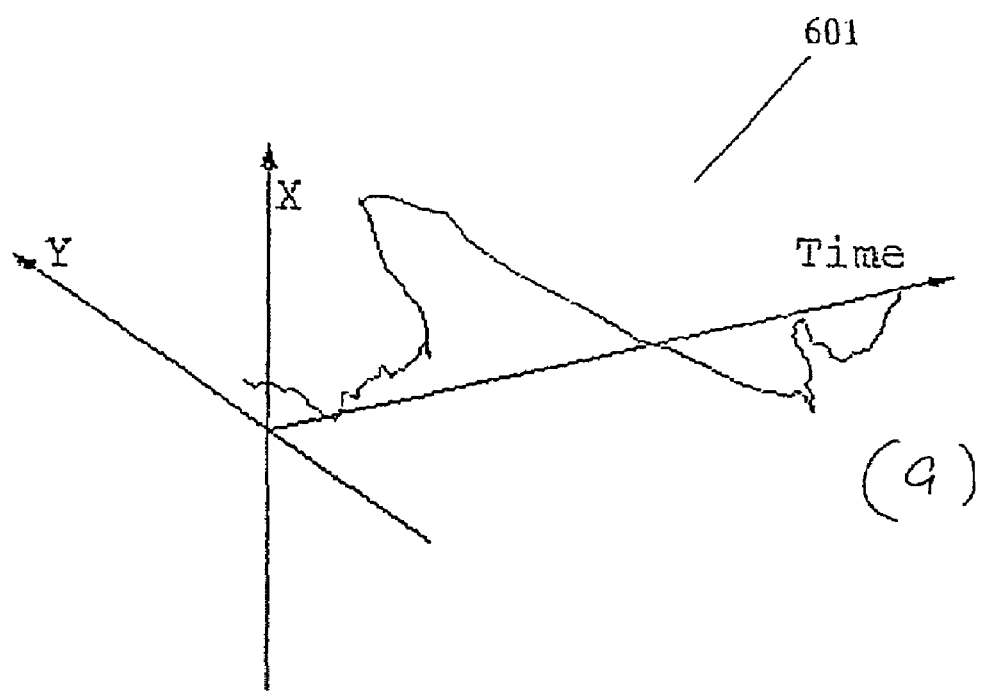
FIG. 8 shows a data and event string analysis for a "lane change" driving maneuver.
Figure 8:
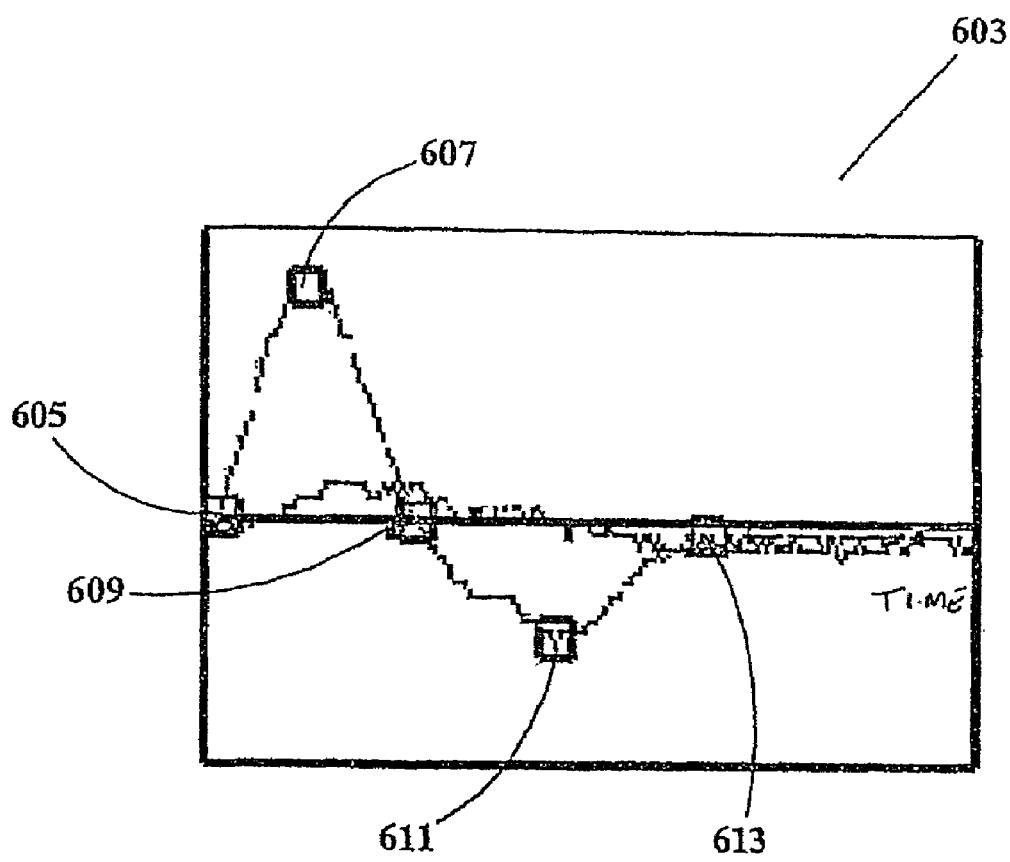

FIG. 7 illustrates the parsing each of the filtered data streams 403*a* and 403*b* into a string of driving events. Driving events are indicated by distinctive patterns in the filtered data stream, and can be classified according, for example, to the following non-limiting set of driving events:

a "Start" event 501, designated herein as S, wherein the variable has an initial substantially zero value;

an "End" event 503, designated herein as E, wherein the variable has a final substantially zero value;

a maximum or "Max" event 505, designated herein as M, wherein the variable reaches a substantially maximum value;

a minimum or "Min" event 507, designated herein as L, wherein the variable reaches a substantially minimum value;

a "Cross" event 509, designated herein as C, wherein the variable changes sign (crosses the zero value on the axis);

a local maximum or "L. Max" event 511, designated herein as O, wherein the variable reaches a local substantially maximum value;

a local flat or "L. Flat" event 513, designated herein as T, wherein the variable has a local (temporary) substantially constant value; and a "Flat" event 515, designated herein as F, wherein the variable has a substantially constant value.

As previously mentioned, each of these driving events designated by a symbolic representation also has a set of one or more numerical parameters which quantify the numerical values associated with the event. For example, a "Max" event M has the value of the maximum as a parameter. In addition, the time of occurrence of the event is also stored with the event.

It is possible to define additional driving events in a similar fashion. For events involving vector quantities, such as for acceleration (as in the present non-limiting example), the driving event designations are expanded to indicate whether the event relates to the x component or the y component. For example, a maximum of the x-component (of the acceleration) is designated as Mx, whereas a maximum of the y-component (of the acceleration) is designated as My.

Referring again to FIG. 7, it is seen that filtered data streams 403*a* and 403*b* represents the following time-ordered sequence of driving events:

an Sx event 521;
an Lx event 523;
an Fy event 525;
an Ex event 527;
an Sy event 529;
an Mx event 531;
an My event 533;
an Ly event 535;
a Ty event 537;
an Ey event 539;
an Sx event 541; and
an Mx event 543.

The above analysis is performed by event handler 201 (FIG. 2). The resulting parsed filtered data thus results in the output of the driving event string from event handler 201:

Sx Lx Fy Ex Sy Mx My Ly Ty Ey Sx Mx

Once again, each of the symbols of the above event string has associated parameters which numerically quantify the individual events.

According to another embodiment of the present invention, there are also variations on these events, depending on the sign of the variable. For example, there may be an Sx positive event and an Sx negative event, corresponding to acceleration and deceleration, respectively.

Analysis of a Driving Event String to Obtain a Sequence of Driving Maneuvers

Following are discussions of some non-limiting examples of basic driving maneuvers.

FIG. illustrates raw data stream 601 for a Lane Change driving maneuver, as a 3-dimensional representation of the x- and y-acceleration components as a function of time. A two dimensional graph 603 shows the x- and y-acceleration components on a common time axis. The driving event sequence for this maneuver is: an Sy event 605; an My event 607; a Cy event 609; an Ly event 611; and an Ey event 613. Thus, the driving event sequence Sy My Cy Ly Ey corresponds to a Lane Change driving maneuver.

Figure 9:
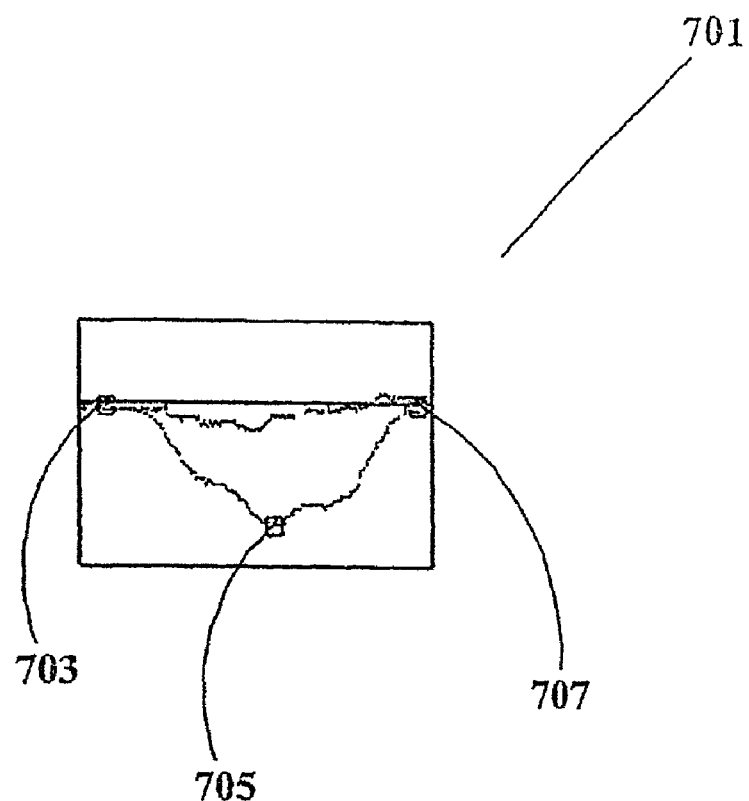
FIG. 9 shows a data and event string analysis for a "turn" driving maneuver.

FIG. 9 illustrates raw data 701 for a Turn driving maneuver, The driving event sequence for this maneuver is: an Sy event 703; an Ly event 705; and an Ey event 707. Thus, the driving event sequence Sy Ly Ey corresponds to a Turn driving maneuver.

Figure 10:
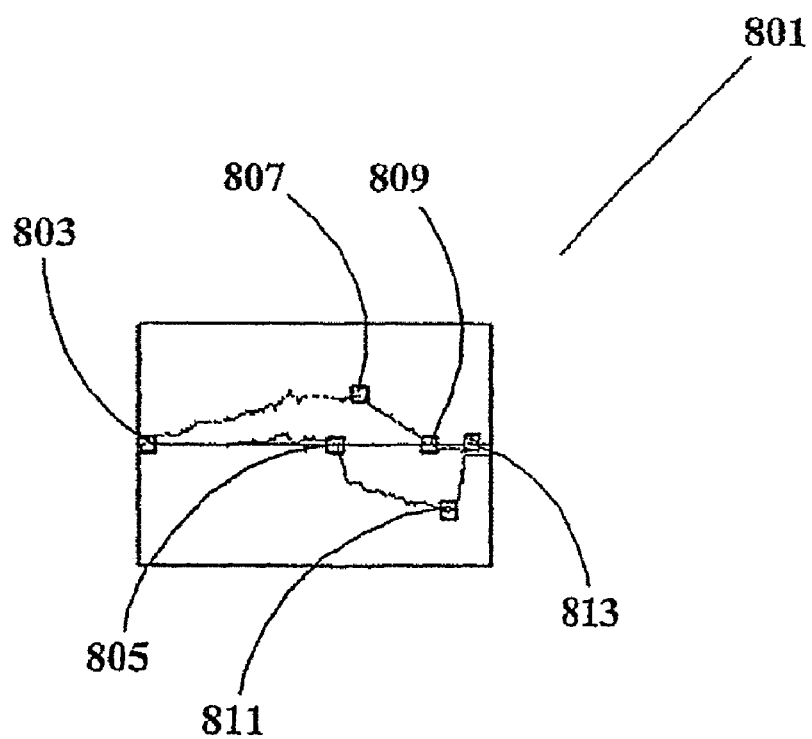
FIG. 10 shows a data and event string analysis for a "braking within turn" driving maneuver.

FIG. 10 illustrates raw data 801 for a Braking within Turn driving maneuver. The driving event sequence for this maneuver is: an Sy event 803; an Sx event 805; an My event 807; an Ey event 809; an Lx event 811; and an Ex event 813. Thus, the driving event sequence Sy Sx My Ey Lx Ex corresponds to a Braking within Turn driving maneuver.

It is noted that the Braking within Turn driving maneuver illustrates how the relative timing between the x- component events and the y-component events can be altered to create a different driving maneuver. Referring to FIG. 10, it is seen that the order of Sx event 805 and My event 807 can in principle be reversed, because they are events related to different independent variables (the forward x-component of acceleration versus and the lateral y-component of acceleration). The resulting driving event sequence, Sy My Sx Ey Lx Ex thus corresponds to a driving maneuver where the maximum of the lateral acceleration (My) occurs before the braking begins (Sx), rather than afterwards as in the original driving maneuver Sy Sx My Ey Lx Ex, as shown in FIG. 10. This change in timing can create a related, but different driving maneuver that can, under some circumstances, have significantly different dynamic driving characteristics and may represent a completely different level of risk. Because the timing difference between these two maneuvers can be only a small fraction of a second, the ability of a driver to successfully execute one of these maneuvers in preference over the other may depend critically on his level of driving skill and experience.

It is further noted that a similar situation exists regarding the relative timing of the Ey event 809 and Lx event 811. These two events are also related to independent variables and in principle can be interchanged to create another different driving event sequence, Sy My Sx Lx Ey Ex. All in all, it is possible to create a total of four distinct, but related event sequences:

1. Sy My Sx Ey Lx Ex
2. Sy Sx My Ey Lx Ex
3. Sy My Sx Lx Ey Ex
4. Sy Sx My Lx Ey Ex

It is noted above that some of these event sequences may have different characteristics. However, some of these sequences may not have significant differences in the characteristics of the resulting driving maneuvers. In this latter case, an embodiment of the present invention considers such differences to be variations in a basic driving maneuver, rather than a different driving maneuver. The alternative forms of the driving event strings for these similar driving maneuvers are stored in the database in order that such alternative forms may be recognized.

It is further noted that the above remarks are not limited to this particular set of driving maneuvers, but may apply to many other driving maneuvers as well.

Figure 11:
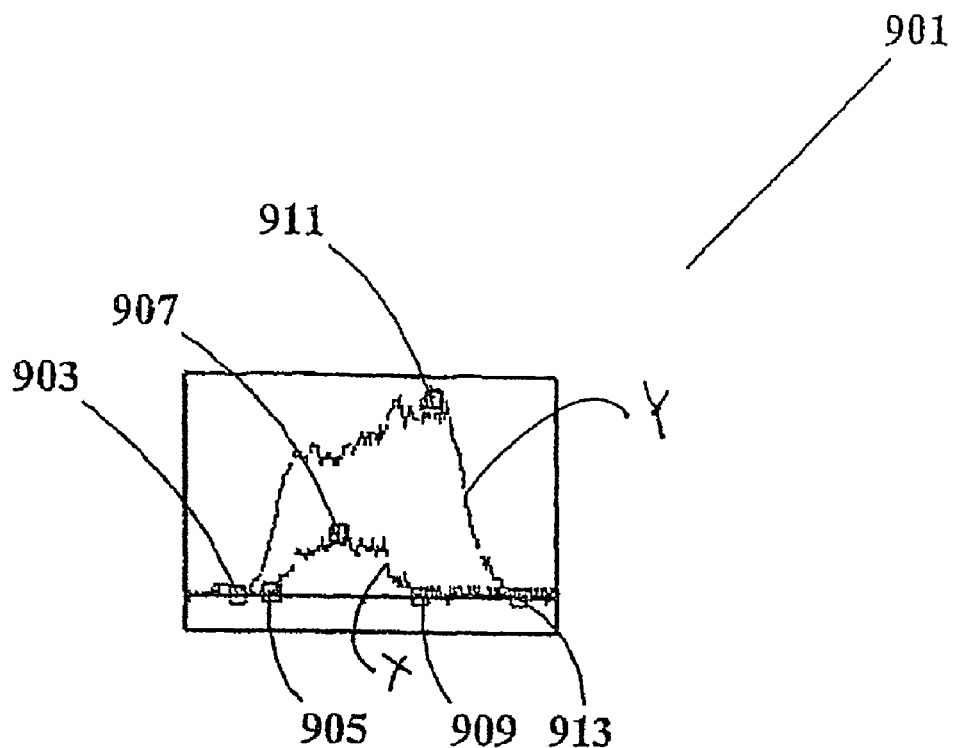
FIG. 11 shows a data and event string analysis for an "accelerate within turn" driving maneuver.
Figure 12:
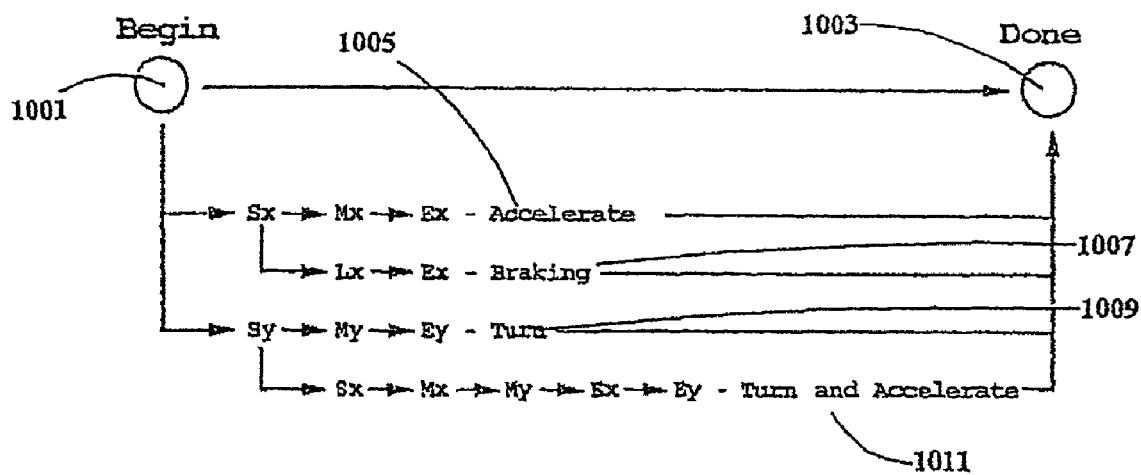
FIG. 12 shows a non-limiting illustrative example of transitions of a finite state machine for identifying driving maneuvers.

FIG. 11 illustrates raw data 901 for an Accelerate within Turn driving maneuver. The driving events indicated are: an Sy event 903; an Sx event 905; an Mx event 907; an Ex event 909; an My event 911; and an Ey event 913. Thus, the driving event sequence Sy Sx Mx Ex My Ey corresponds to an Accelerate within Turn driving maneuver.

FIG. 10 illustrates a non-limiting example of the transitions of a finite state machine for identifying driving maneuvers, according to a preferred embodiment of the present invention. Such a machine can perform pattern recognition and function as the pattern recognition unit 215 (FIG. 1), or can supplement the action thereof. In this example, the machine of FIG. 10 can recognize four different driving maneuvers: Accelerate, Braking, Turn, and Turn and Accelerate. The transitions initiate at a begin point 1001, and conclude at a done point 1003. The machine examines each driving event in the input event string, and traverses a tree with the branchings corresponding to the recognized driving maneuvers as shown. If the first event is Sx, then the maneuver is either Accelerate or Braking. Thus, if the next events are Mx Ex, it is an Accelerate maneuver, and a transition 1005 outputs Accelerate. If the next events are Lx Ex, however, a transition 1007 outputs Braking. Similarly, if the first event is Sy, the maneuver is either Turn or Turn and Accelerate. If the next events are My Ey, a transition 1009 outputs Turn. Otherwise, if the next events are Mx My Ex Ey, a transition 1011 outputs Turn and Accelerate. In this illustrative example, if there is no node corresponding to the next driving event in the event string, the machine makes a transition to done point 1003 without identifying any maneuver. In practice, however, the finite state machine will associate a driving maneuver with each physically-possible input string.

Method and Processing

Figure 13:
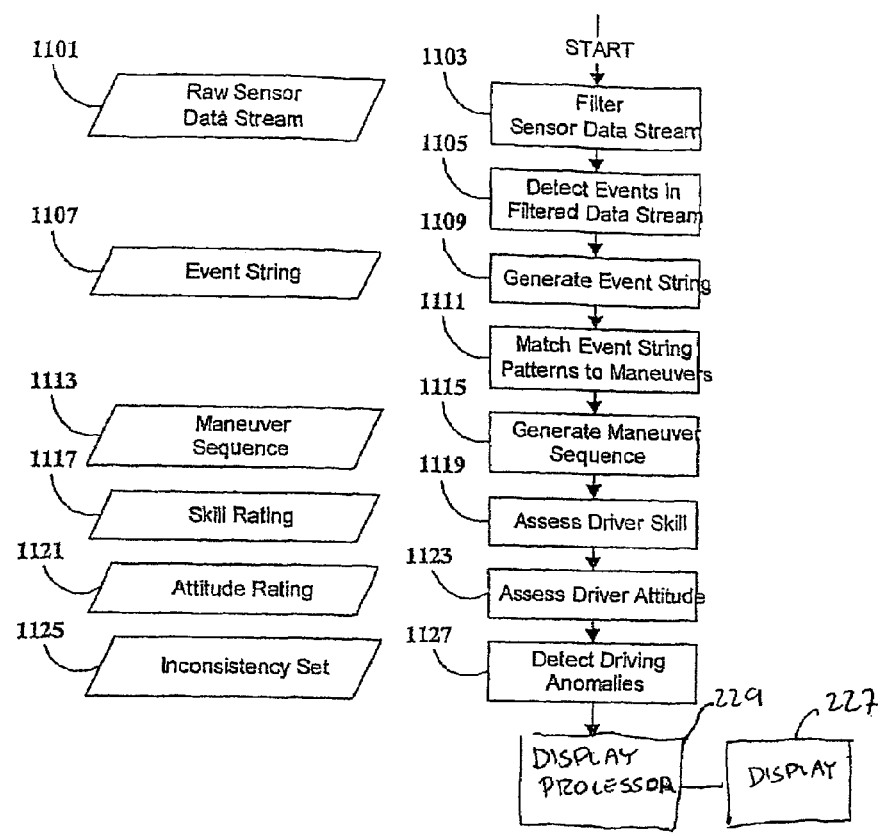
FIG. 13 is a flowchart of a method for analyzing and evaluating vehicle driver performance.

FIG. 13 is an overall flowchart of a method according to a preferred embodiment of the invention for analyzing and evaluating vehicle driver performance and behavior. The input to the method is a raw sensor data stream 1101, such as the output 102 from sensor set 101 (FIG. 1). The method starts with a filter step 1103 in which the sensor data stream is filtered to remove extraneous noise. This is followed by an event-detection step 1105, after which a driving event string 1107 is generated in a step 1109. After this, a pattern-matching step 1111 matches the events of event string 1107 to maneuvers in maneuver library 213 (FIG. 2), in order to generate a maneuver sequence 1113 in a step 1115. Following this, a step 1119 assesses the driver's skill and creates a skill rating 1117. In addition, a step 1123 assesses the driver's attitude and creates an attitude rating 1121. The results of the driver skill assessment step 1119, the driver attitude assessment step 1123, and the driving anomaly detection step 1127 are then input to is input to the display 229 which prepares the data for display on the display 227, as described above in reference to FIG. 1.

Assessing Skill and Attitude

Figure 14:
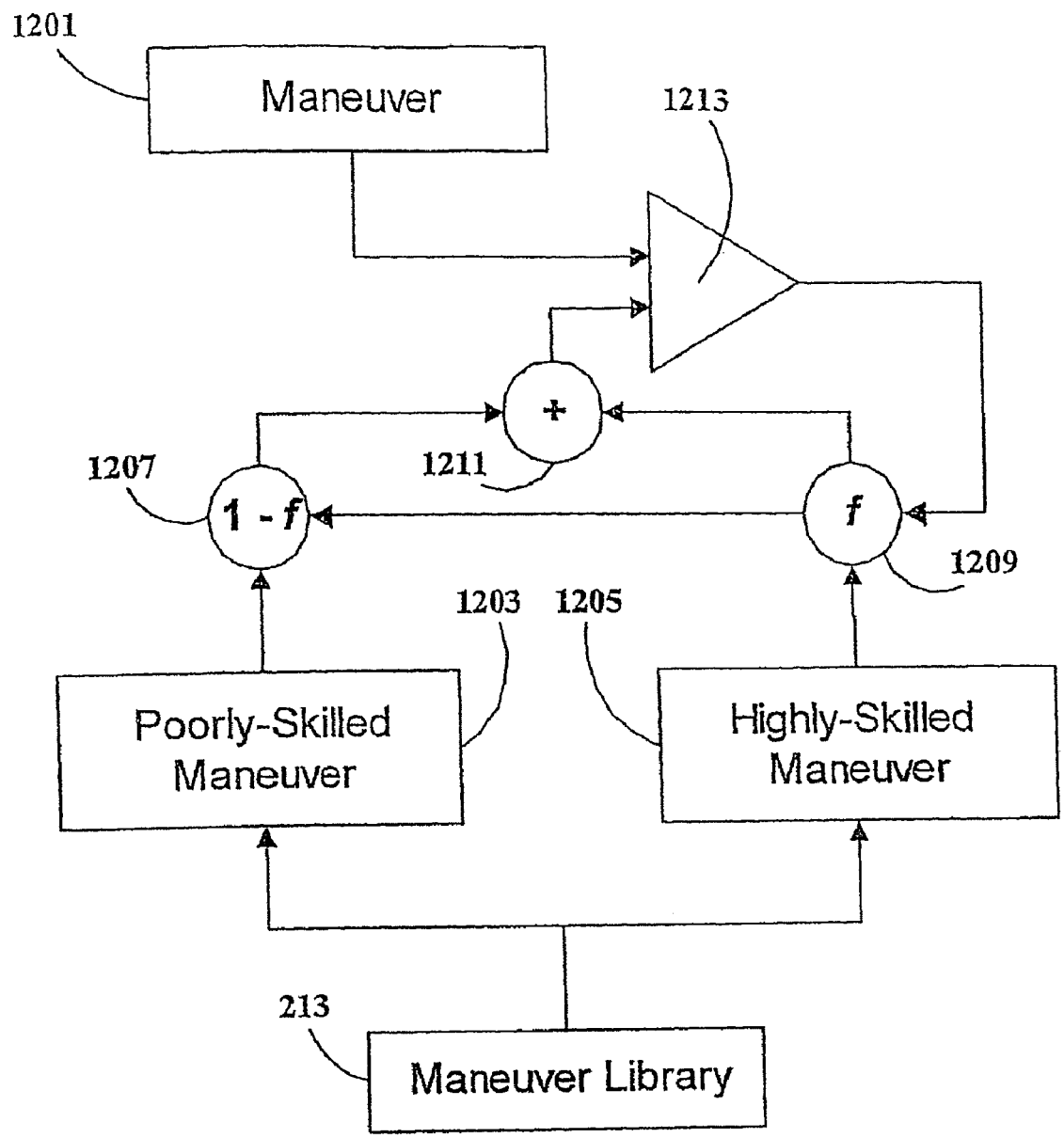
FIG. 14 is schematic diagram of an arrangement for assessing driver skill according to an embodiment of the present invention.

FIG. 14 is a schematic diagram of an arrangement or process according to a preferred embodiment of the present invention for assessing driver skill for a maneuver 1201. For this assessment, an executed maneuver 1201 is represented by a driving event sequence, as described above. The maneuver library 213 (FIG. 1) contains a poorly-skilled maneuver template 1203, which is a driving event sequence for the same maneuver, but with parameters corresponding to those of an inexperienced or poor driver. Maneuver library 213 also contains a highly-skilled maneuver template 1205, which is a driving event sequence for the same maneuver, but with parameters corresponding to those of an experienced and skilled driver. Poorly-skilled maneuver template 1203 and highly-skilled maneuver template 1205 are combined in a weighted fashion by being multiplied by a multiplier 1207 and a multiplier 1209, respectively, with the weighted components added together by an adder 1211. Multiplier 1209 multiplies highly-skilled maneuver template 1205 by a factor f, which ranges from 0 to 1, whereas multiplier 1207 multiplies poorly-skilled maneuver template 1203 by a factor (1−f), so that the output of adder 1211 is a weighted linear combination of poorly-skilled maneuver template 1203 and highly-skilled maneuver template 1205. This weighted linear combination is input into a comparator 1213, which also has an input from the executed maneuver 1201. The output of comparator 1213 adjusts the value of f for both multiplier 1207 and multiplier 1209, such that the stable value of f corresponds to the weighted combination of poorly-skilled maneuver template 1203 and highly-skilled maneuver template 1205 that comes closest to being the same as maneuver 1201. Thus, the factor f serves as a skill ranking of the driver's performance for maneuver 1201, where a value of f=1 represents the highest degree of skill, and a value of f=0 represents the lowest degree of skill. In an embodiment of the present invention, skill ratings corresponding to several driving maneuvers can be statistically-combined, such as by analyzer 225 (FIG. 2).

As noted, FIG. 14 is a schematic diagram of a process to assess skill level for a maneuver. From the perspective of an algorithm or method, the procedure involves finding the value of f in the interval [0, 1] for which the f-weighted highly-skilled template added to a (1=f)-weighted poorly-skilled most closely approximates the maneuver in question.

In still another embodiment of the present invention, the assessing of skill by comparison of the maneuver with various standards is accomplished through the application of well-known principles of fuzzy logic.

Figure 15:
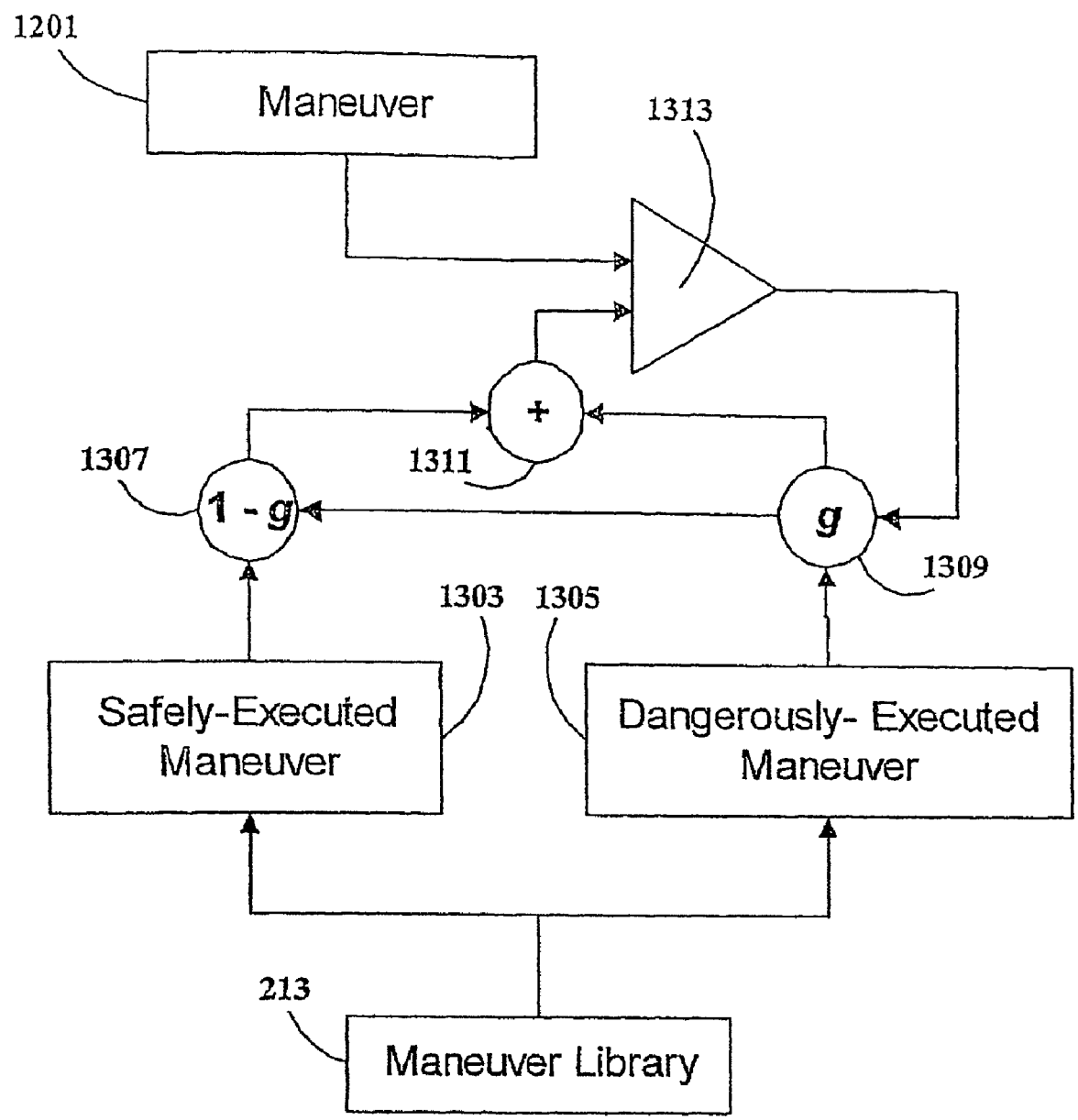
FIG. 15 is a schematic diagram of an arrangement for assessing driver attitude.

A similar assessment regarding driver attitude is illustrated in FIG. 15. The templates retrieved from the maneuver library 213 are a template 1303 for a safely-executed maneuver corresponding to maneuver 1201, and a template 1305 for a dangerously-executed maneuver corresponding to maneuver 1201. These are combined in a weighted fashion by a multiplier 1309, which multiplies dangerously-executed maneuver 1305 by a factor g, on the interval [0, 1], and a multiplier 1307, which multiplies safely-executed maneuver 1303 by a factor of (1=g). The multiplied maneuvers are added together by an adder 1311, and the combination is compared against maneuver 1201 by a comparator 1313 to find the value of g which yields the closest value to the original maneuver. Thus, g serves as a ranking of the driver's attitude for maneuver 1201, where a value of g=1 represents the greatest degree of danger, and a value of g=0 represents the lowest degree of danger. An intermediate value of g, such as g=0.5 can be interpreted to represent "aggressive" driving, where the driver is taking risks.

As noted, FIG. 15 is a schematic diagram of a process to assess attitude level for a maneuver. From the perspective of an algorithm or method, the procedure finds the value of g in the interval [0, 1] for which the g-weighted dangerously-executed maneuver template added to a (1−g)-weighted safely-executed maneuver most closely approximates the maneuver in question.

In an embodiment of the present invention, attitude ratings of many driving maneuvers as executed by the driver can be statistically-combined, such as by analyzer 225 (FIG. 1). When statistically combining attitude ratings for different maneuvers according to embodiments of the present invention, note that different maneuvers have different risk coefficients, as shown in Table 1. The more risk a maneuver entails, the higher is the risk coefficient. As a non-limiting example, a driver who performs a Lane Change (risk coefficient=4) with a g=0.3 and then performs a Braking within Turn (risk coefficient=8) with a g=0.7 would have an average driving attitude for these two maneuvers given by:

(4*0.3+8*0.7)/2=3.4

In another embodiment of the present invention, the assessed attitude of the driver is statistically computed using the maximum (most dangerous) value of the set of maneuvers. For the example above, this would be 8*0.7=5.6.

It is further noted that the factors f and g are arbitrary regarding the choice of the interval [0, 1], and the assignment of meaning to the extremes of the interval. A different interval could be chosen, such as 1-10, for example, with whatever respective meanings are desired for the value 1 and the value 10. Thus, the examples above are non-limiting.

Anomaly Detection

Figure 16:
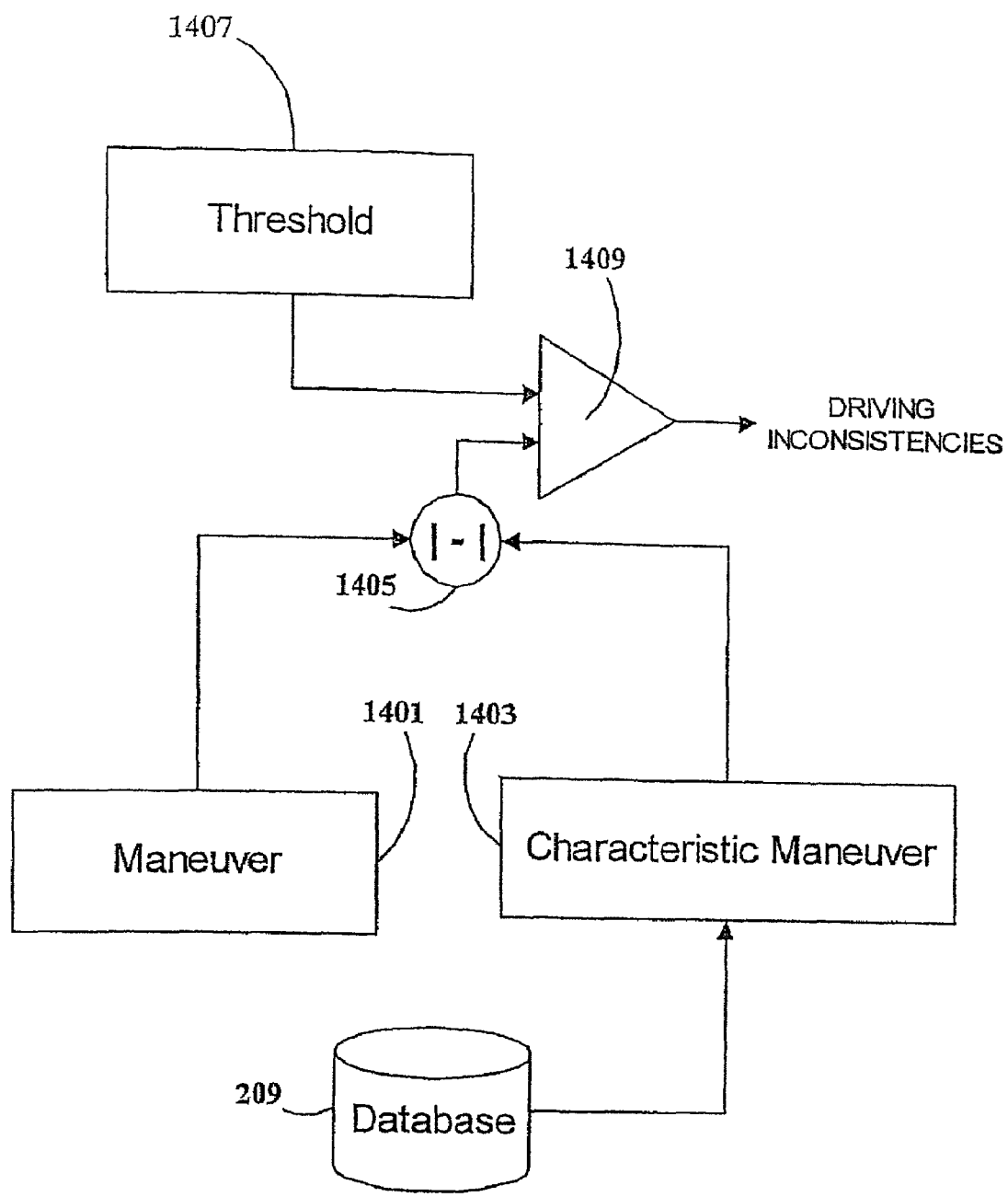
FIG. 16 is a schematic diagram of an arrangement for determining whether there is a significant anomaly in the current driver's behavior and/or performance.

FIG. 16 is a schematic diagram of an arrangement or process according to an embodiment of the present invention for determining whether there is a significant anomaly in the behavior and/or performance of the current driver in comparison to that driver's past behavior and performance. A particular driving maneuver 1401 is under scrutiny, and is compared against a previously obtained record 1403 of the current driver's past execution of the same maneuver. Characteristic record 1403 is retrieved from database 209 (FIG. 2). The magnitude of the difference between maneuver 1401 and characteristic maneuver 1403 is obtained by a magnitude subtractor 1405, which outputs the absolute value of the difference. A discriminator 1409 compares the difference magnitude from magnitude subtractor 1405 against a threshold value 1407. If the difference magnitude exceeds threshold value 1407, discriminator 1409 outputs a driving inconsistency signal.

As noted, FIG. 16 is a schematic diagram of a process to assess discrepancies or anomalies in the performance of a maneuver when compared to a previously-recorded reference. From the perspective of an algorithm or method, the procedure compares the magnitude of the difference of the maneuver and the previously-recorded reference against a threshold value 1407. If the magnitude of the difference exceeds threshold value 1407, a discrepancy is signaled.

In some cases, such as for inexperienced drivers, it is to be expected that over time the quality of driving may steadily improve. In cases such as this, there may come a point where the driver's performance and/or attitude may improve to the point where his or her driving may exhibit significant anomalies (because of the improvements). Therefore, in an embodiment of the present invention, the system may update the characteristic records in database 209 to account for improved quality of driving.

Figure 17:
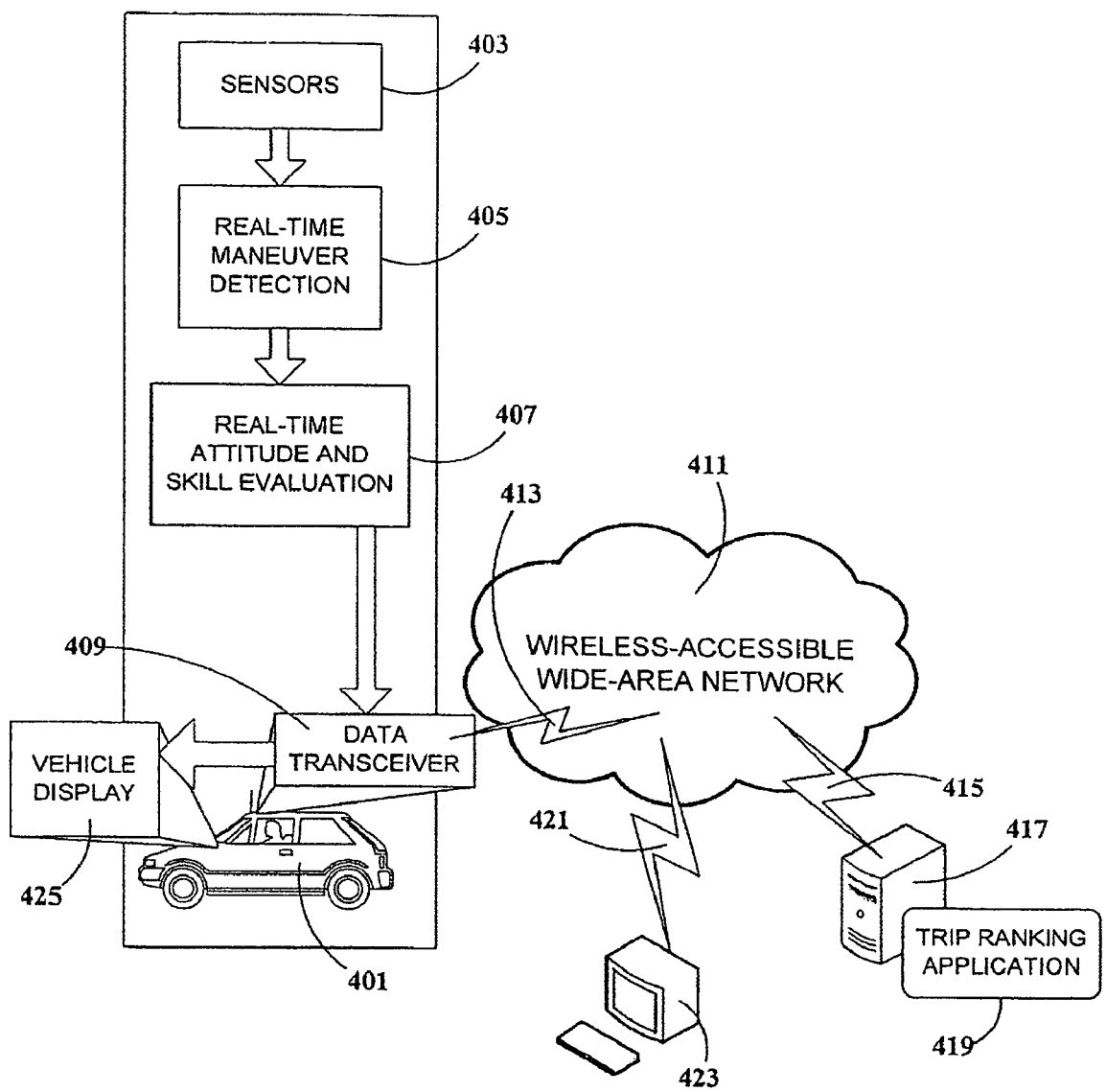
FIG. 17 shows a configuration of the system of the invention in accordance with one embodiment of the invention.

FIG. 17 is a conceptual diagram of a server-based system for evaluating driver performance over a network, according to an embodiment of the present invention. A vehicle 401 is equipped with sensors 403, the outputs of which are fed to a maneuver-detecting module 405 operating in real-time. The maneuvers detected by module 405 are in turn fed to an attitude and skill evaluating module 407, which sends the evaluation to a data transceiver 409, which feeds a vehicle data display 425 as well as a wireless-accessible wide-area network ("WAN") 411, such as a cellular communication system, via a wireless data link 413. A data link 415 connects to a server 417 having a trip ranking application 419 (typically software), which analyzes driving sessions or trips to provide meaningful ranking indications thereof. In an embodiment of the present invention, server 417 communicates the ranking to network 411, which is then passed via a link 421 to a terminal 423 for display and interactive query operations.

While the invention has been described with respect to a limited number of embodiments, it will be appreciated that many variations, modifications and other applications of the invention may be made.

The invention claimed is:

1. A system for displaying real time evaluations of driving sessions to a driver, the system comprising:
   (a) a vehicle sensor utility operative to monitor the state of the vehicle and to output a raw data stream corresponding thereto;
   (b) a driving event handler operative to receive the raw data stream, to detect driving events based thereon and to output a driving event string containing at least one driving event representation corresponding thereto;
   (c) a maneuver detector operative to receive said at least one driving event representation, recognize patterns of driving maneuvers and to construct and output a driving maneuver representation corresponding thereto, said driving maneuver representation containing a representation of at least one driving maneuver;
   (d) a processor configured to evaluate a driving session based upon rating each of a plurality of driving maneuvers comprised in said driving session and to display the evaluation of said driving session and/or the rating of said plurality of driving maneuvers on a display; and
   (e) a display.

2. The system of claim 1, wherein said driving session is categorized into a number of driving categories and the category of each driving session is determined by the number and rate of the plurality of driving maneuvers comprised in said driving session.

3. The system of claim 1, wherein said system is further adapted to display one or more major risk maneuvers from among said plurality of driving maneuvers in said driving session.

4. The system of claim 1, further comprising a database for storing characteristic records of driving maneuvers associated with at least one driver, and means for comparing a stored characteristic driving maneuver with a driving maneuver representation of a maneuver currently being carried out by said driver, and for providing an indication to said driver if an anomaly is detected from the stored characteristic driving maneuver.

5. A method for displaying real time evaluations of driving sessions to a driver which comprises the steps of:
   (a) monitoring the state of the vehicle and outputting a raw data stream corresponding thereto;
   (b) receiving the raw data stream, detecting driving events based on said raw data stream and outputting a driving event string containing at least one driving event representation corresponding to the detected driving event;
   (c) deriving from said at least one driving event representation patterns of driving maneuvers and constructing and outputting a driving maneuver representation corresponding thereto, said driving maneuver representation containing a representation of at least one driving maneuver; and
   (d) evaluating a driving session based upon rating of each of a plurality of driving maneuvers comprised in said driving session; and
   (e) displaying the evaluation of said driving session and/or rating of said plurality of driving maneuvers on a display.

6. The method of claim 5, wherein said driving session is categorized into a number of driving categories and the category of each driving session is determined by the number and rate of the plurality of driving maneuvers comprised in said driving session.

7. The method of claim 5, further comprising displaying one or more major risk maneuvers from among said plurality of driving maneuvers in said driving session.

8. The method of claim 5, further comprising a step of storing characteristic records of driving maneuvers associated with at least one driver, comparing a stored characteristic driving maneuver with a driving maneuver representation of a maneuver currently being carried out by said driver, and providing an indication to said driver if an anomaly is detected from the stored characteristic driving maneuver.

9. A computer program product comprising a computer useable medium having computer readable program code embodied therein for displaying real time evaluations of driving sessions to a driver, comprising:
   (a) monitoring the state of the vehicle and outputting a raw data stream corresponding thereto;
   (b) receiving the raw data stream, detecting driving events based on said raw data stream and outputting a driving event string containing at least one driving event representation corresponding to the detected driving event;
   (c) deriving from said at least one driving event representation patterns of driving maneuvers and constructing and outputting a driving maneuver representation corresponding thereto, said driving maneuver representation containing a representation of at least one driving maneuver;
   (d) evaluating a driving session based upon rating of each of a plurality of driving maneuvers comprised in said driving session; and
   (e) displaying the evaluation of said driving session and/or rating thereof.

* * * * *

UNITED STATES PATENT AND TRADEMARK OFFICE
CERTIFICATE OF CORRECTION

PATENT NO. : 7,561,054 B2 Page 1 of 1
APPLICATION NO. : 11/450697
DATED : July 14, 2009
INVENTOR(S) : Ofer Raz, Hod Fleishman and Itamar Mulchadsky It is certified that error appears in the above-identified patent and that said Letters Patent is hereby corrected as shown below:

ON THE TITLE PAGE, ITEM [56] INSERT:
(56) reference --2004/0236476--

Signed and Sealed this

Thirtieth Day of March, 2010

David J. Kappos
*Director of the United States Patent and Trademark Office*